Jan. 6, 1970 D. BELLINI ET AL 3,488,059

GRAMOPHONE RECORD PLAYER

Filed Sept. 27, 1967 6 Sheets-Sheet 1

INVENTOR.

DARIO BELLINI
MARIO BELLINI

BY Nolte & Nolte

ATTORNEYS

Jan. 6, 1970 D. BELLINI ET AL 3,488,059

GRAMOPHONE RECORD PLAYER

Filed Sept. 27, 1967 6 Sheets-Sheet 2

INVENTOR.

DARIO BELLINI
MARIO BELLINI

BY Natale & Natale

ATTORNEYS

INVENTOR.
DARIO BELLINI
MARIO BELLINI
BY Malle & Malle
ATTORNEYS

INVENTOR.
DARIO BELLINI
MARIO BELLINI
BY Molle & Molle
ATTORNEYS

GRAMOPHONE RECORD PLAYER

Filed Sept. 27, 1967

INVENTOR.
DARIO BELLINI
MARIO BELLINI
BY [signature]
ATTORNEYS

GRAMOPHONE RECORD PLAYER

Filed Sept. 27, 1967

INVENTOR.
DARIO BELLINI
MARIO BELLINI
BY [signature]
ATTORNEYS

United States Patent Office 3,488,059

Patented Jan. 6, 1970

3,488,059

GRAMOPHONE RECORD PLAYER

Dario Bellini and Mario Bellini, both of Viale Coni Zugna 8, Milan, Italy

Filed Sept. 27, 1967, Ser. No. 670,926
Claims priority, application Italy, Sept. 29, 1966, 22,436/66, Patent 180,423
Int. Cl. G11b *25/04*
U.S. Cl. 274—9 7 Claims

ABSTRACT OF THE DISCLOSURE

In a portable record player the arm carrying the record centering and locking plug is lowered by the edge of the record to be played, a spring assisting such lowering movement only during the last part thereof; the plug is in turn engaged with the turntable by respective teeth having helicoidally sloping cooperating flanks. The plug is stopped at the end of the play by the pick-up arm and is thus raised from the record, which in turn is expelled from the record payer.

This invention relates to a device for playing gramophone records, which is capable of performing the functions required for this operation automatically.

In recent times, there has been an ever increasing demand for apparatus in which the record to be played is slipped into a side slot formed in the device and directly starts the sequence of operations which are necessary to effect playing.

More particularly, apparatus of this kind are capable of performing, automatically and in a manner which is independent of their special location, all the steps which follow the manual introduction of the record, namely: the correct positioning of the record and its locking on the record-player turntable, the correct positioning of the pickup arm at the starting spirals of the record grooves, the starting of the turntable, the restoration of the pickup arm to its initial position upon completion of playing, the stoppage of the record player turntable and the ejection of the played record.

In a known device of this kind a rockable control member is provided, against which the record is made to impringe at the end of its introduction stroke and which, upon being oscillated, causes the centering and locking of the record, the starting of the turntable driving motor and the positioning of the pickup arm. These are, indeed, the three steps which are necessary to initiate the record play. A device of the kind referred to now has, as a centering and locking member for the record on the turntable, a plug-shaped member borne, in a freely rotatable manner, at the end of a rocking arm and made to approach said turntable for centering and locking the record and to be withdrawn from the turntable after playing the record.

Such a centering and locking device for the record, in the form of a plug cooperating with the turntable and made firmly to lock the record, has proved to be the most suitable and reliable one for an apparatus which, during the record play, should be capable of assuming any spacial location, particularly, in the case of a portable record-player.

In a portable record player, a vital requirement, which of course supplements the obvious ones of constructional simplicity and reliability irrespective of the spacial orientation of the device, is the compactness of the component parts so as to obtain a lightweight and compact assembly. As a general rule, it is desirable that the device should be the thinnest obtainable one and that it be only slightly larger than the records to be played.

It should be observed, in this particular respect, that the constructional arrangements embodied heretofore are still unsatisfactory, in that they are too bulky due to their large size, and thus inconvenient to carry.

The principal object of the present invention is thus to provide a record player whose playing cycle is completely automated independently of its spacial orientation, and whose constructional configuration of parts is extremely compact, and self-contained.

Such an object is achieved, in the present invention, by a device of the kind comprising a casing with a lateral slot for introducing a record to be played, a record turntable driven by an electric motor, a member for centering and locking said record against said turntable, said member being freely rotatably supported at the free end of a lever arm oscillable about an axis parallel to the plane of said turntable, a pickup arm connected to said lever arm and a displaceable control member connected to said lever arm and arranged so as to be struck by the record as the latter is introduced through said slot and placed on said turntable so as to cause said centering and locking member approach to said turntable, said turntable driving motor to be started and said pickup arm to approach the record to be played. The inventive device is essentially characterized in that said control member is connected to the lever arm which carries the centering and locking member by a link block having at least two shaped and diverging guiding branches, in that between the control member and the lever arm a spring is active which causes said lever arm make the centering and locking member approach the turntable when it is engaged by a branch of said link block and to swing said lever arm in a direction so as to withdraw said member from said turntable when the other branch of said link block is engaged, in that between the centering and locking member and the turntable a clutch is provided, at least one surface of which is sloping with respect to the turntable plane, and in that between the pickup arm and the centering and locking member engagement means are provided to lock said member when the pickup arm approaches it upon completion of a record play.

The invention will be more detailedly described hereinafter with reference to the accompanying drawings, which are illustrative of a few non-limiting exemplary embodiments.

Figures 6, 8, 9:
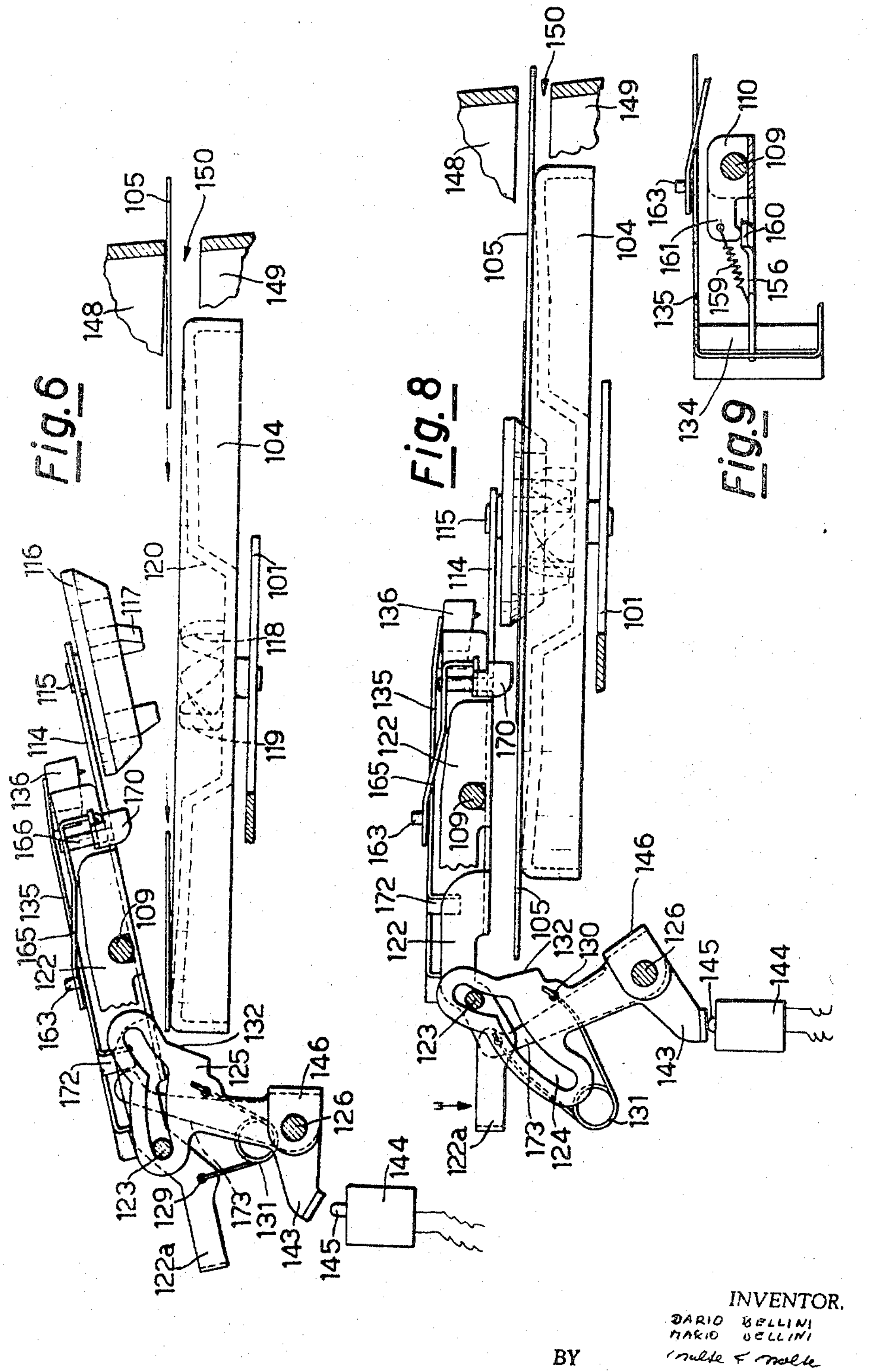
FIGURES 6, 7 and 8 are the counterparts of FIGS. 1, 2 and 4, respectively, and are illustrative of an alternative embodiment.
Figure 7:
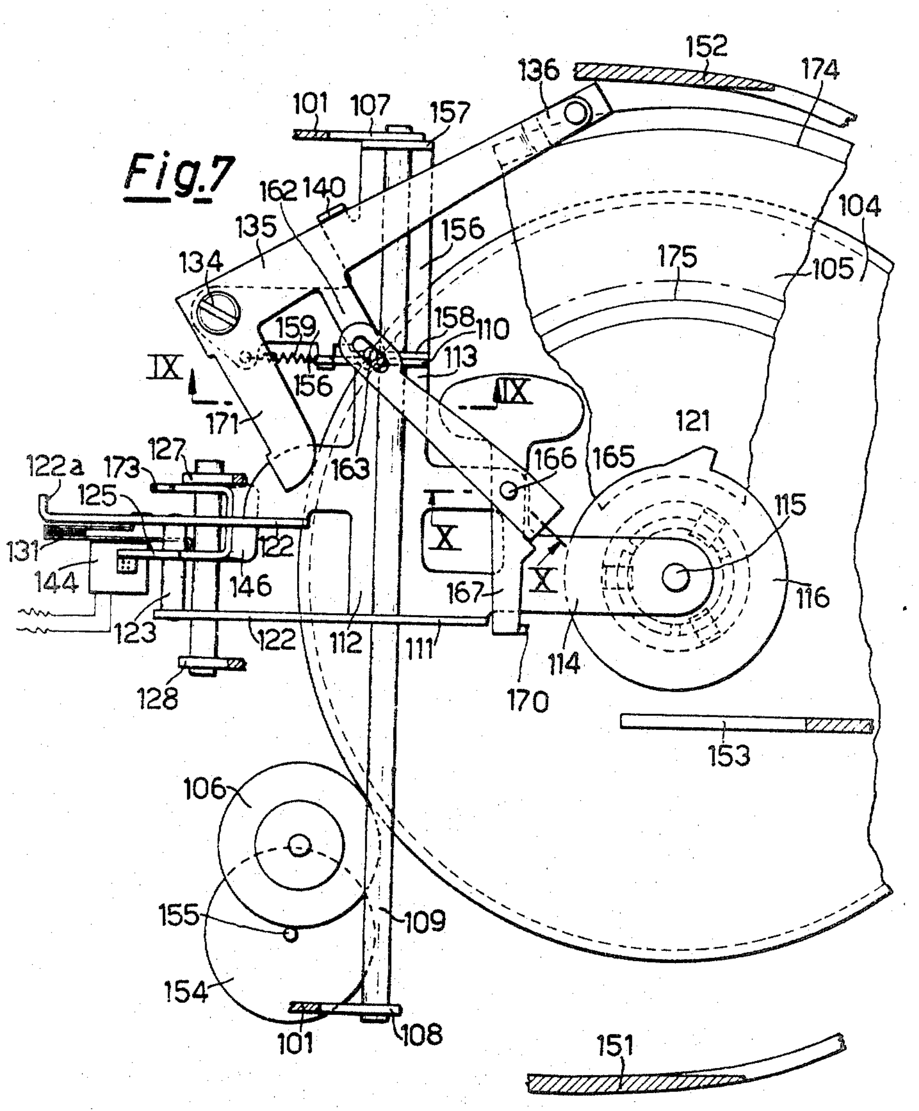
Figure 10:
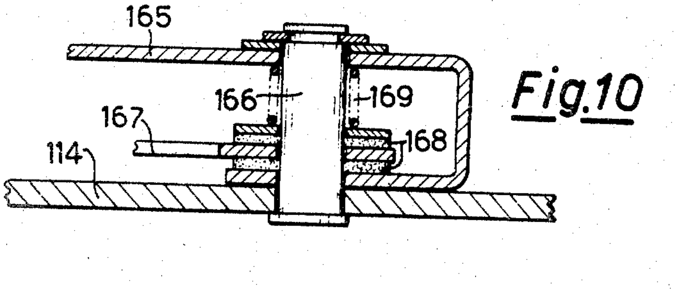
Figure 11:
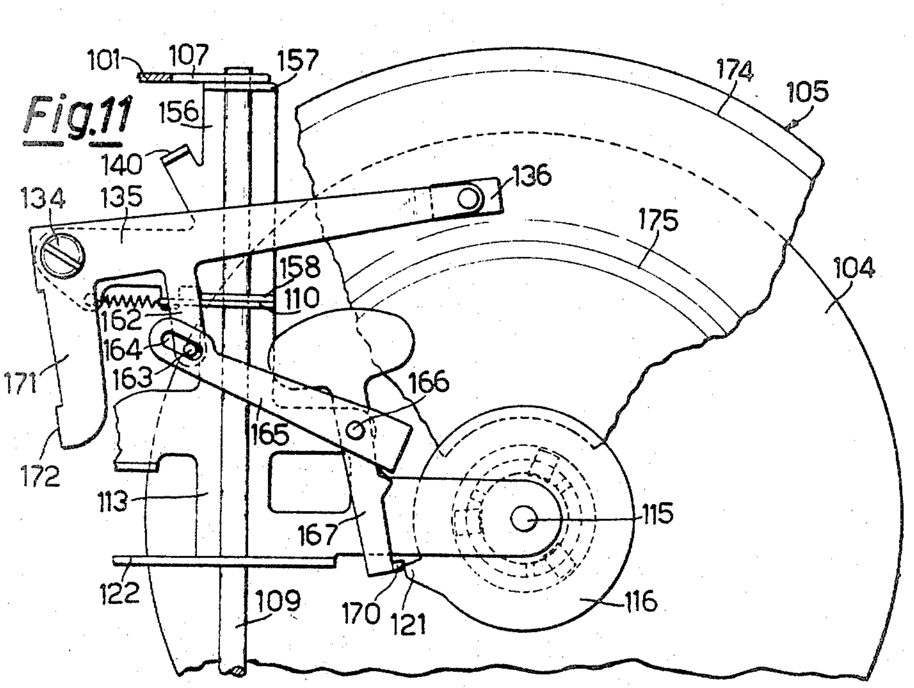
Figure 12:
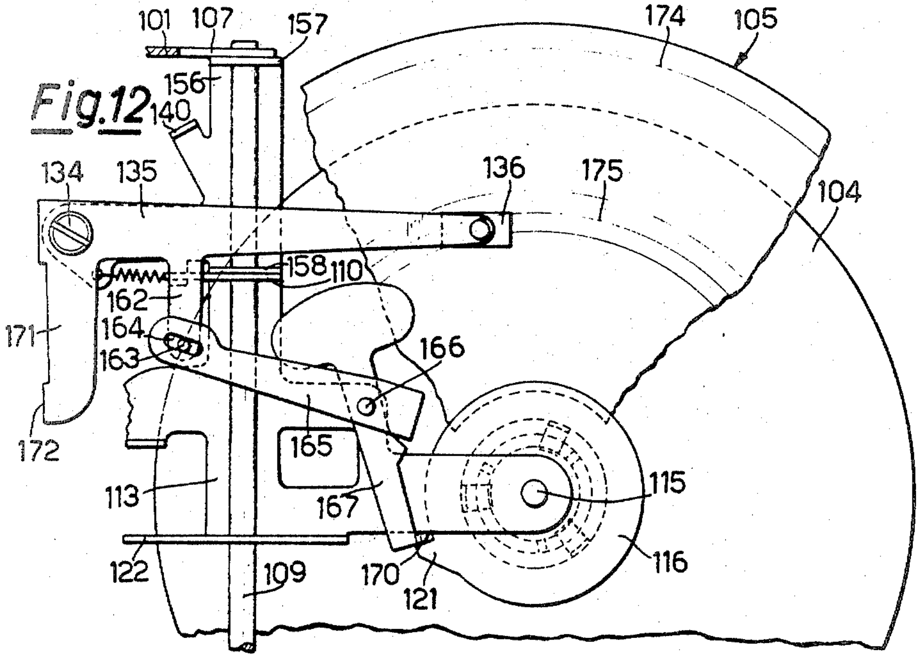

FIGURES 9 and 10 are sectional views through lines IX—IX and X—X of FIG. 7, respectively, and FIGURES 11 and 12 show a detail of the mechanism shown in FIGS. from 6 to 9 inclusive, in two different operative positions.

In the ensuing disclosure, the term "record" is used to connote a gramophone record.

The general arrangement of the parts of the apparatus which incorporates the subject device is not shown in its entirety in the drawings, a few component parts only having been diagrammatically shown.

Having now reference, at the outset, to FIGS. 1 to 5, it can be seen that, solidly affixed to a part of the structure 1, there is an upright pin 2 on which there is, idly rotatably mounted, a record turntable 4 intended to support a record 5 and to drive same so as to rotate during playing thereof. The rotation of the turntable 4 is conventionally obtained by an electric motor 54 with driving shaft 55, via a driving wheel 6 made to adhere to said turntable.

Two bearings 7 and 8, solidly affixed to the frame 1, support a shaft 9 at a certain distance above the turntable 4 and with its axis in a plane parallel to that which contains the turntable plane surface. The shaft 9 supports, by two ears 10 and 11, a multi-armed lever, generally shown as 12. A portion of said lever carries said ears 10 and 11 and extends beneath the shaft 9 parallel to it. An arm 14 of the lever 12 is extended nearly perpendicularly from an end of portion 13 towards the center of the turntable 4 and carries, in the vicinity of its free end, a pin 15 about which is idly mounted a hollow plug 16 whose external outline is conical. From the hollow of said plug three teeth 17 protrude downwards, intended to cooperate, as will be explained hereinafter, with a cam 18 having three lobes 19 and contained in a central cavity 20 of the turntable 4. The number of said teeth 17 and of the attendant lobes of the cam 18 can also be other than three. It is important, however, that the lobes of the cam 18 have sloping sides, so as to cooperate with the teeth 17, in the manner of a helical-tooth clutch.

Moreover, the plug 16 has, on its outer circumferential surface, a tooth 21 (visible in FIG. 2) whose purpose will be described later.

Figures 1, 3:
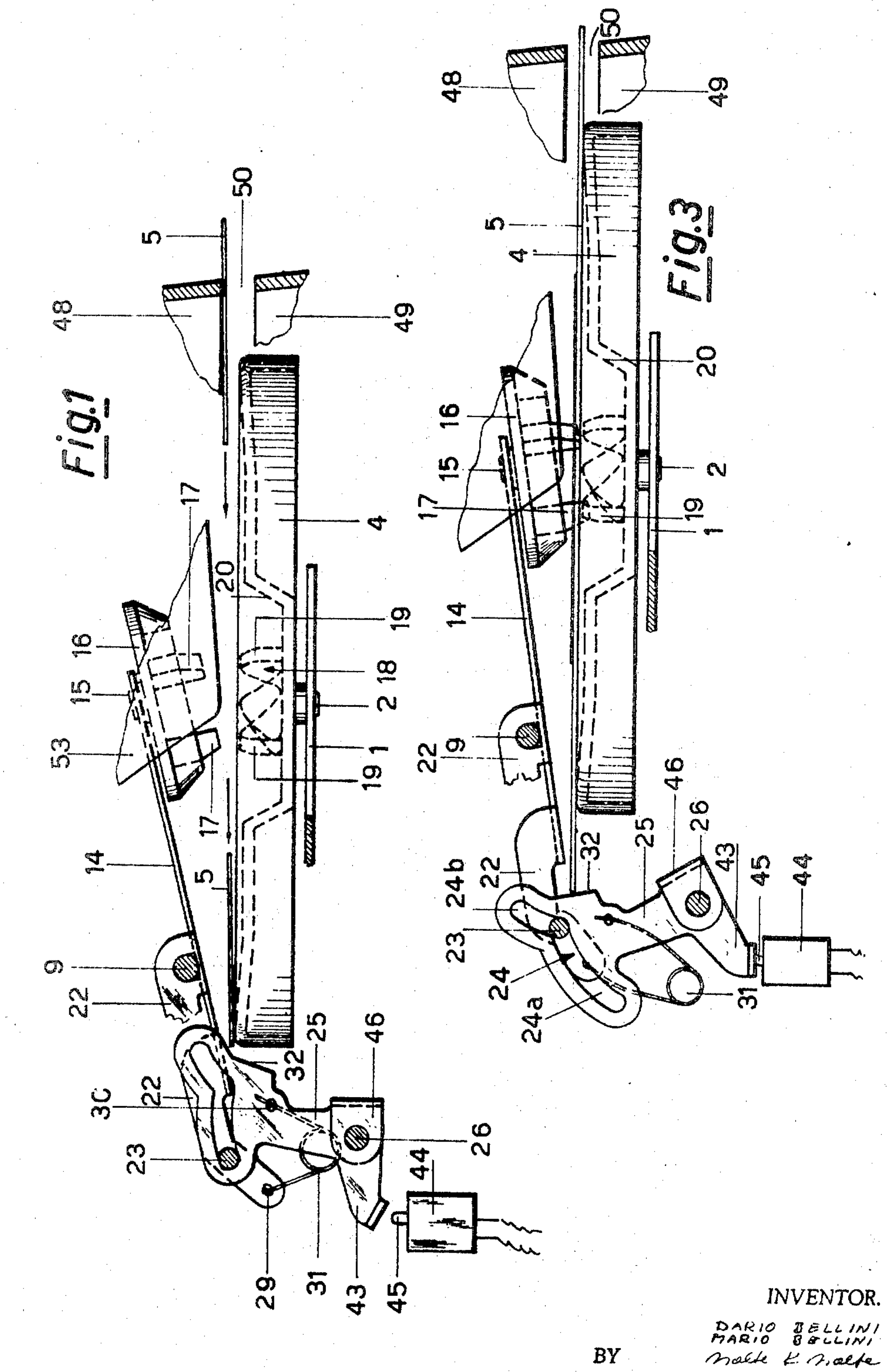
FIGURE 1 shows the inner mechanism of the device as viewed laterally in its rest position, the outer casing and a few component parts having been removed.
FIGURES 3 and 4 show the mechanism as viewed laterally as in FIG. 1, in an intermediate working position and in the record playing position respectively.

The lever 12 has an extension formed by two tabs 22 which are extended from the end of the portion 13 in a direction away from the arm 14 (leftwards of the shaft 9 as viewed in FIG. 1). In the neighbourhood of their free ends, the tabs 22 carry a pin or follower 23 which enters a shaped slot 24 formed in a lever 25. Said lever 25 can be rotated about a pivot 26 affixed to bearings 27 and 28 of the frame 1. The slot 24 has two diverging branches **24*a* and 24*b*, respectively. The branch 24*a* is longer than the branch 24*b* and the variation of its radius with respect to the center of rotation of lever 25 (axis of the pivot 26) is considerably less than the corresponding radius variation of the second branch 24*b***.

Between a point 29 of either tab 22 and a point 30 of lever 25 is hooked a spring 31 whose central portion is coiled and which tends to force the points 29 and 30 apart from one another, thus keeping the lever 25 in its rest position with the pin 23 at an end of the shaped slot 24 (as shown in FIG. 1). With the front profile 32 (facing the turntable 4) of the lever 25, a record 5 is intended to cooperate during its introduction and ejection, as will become apparent from the ensuing description of the operation.

Figure 2:
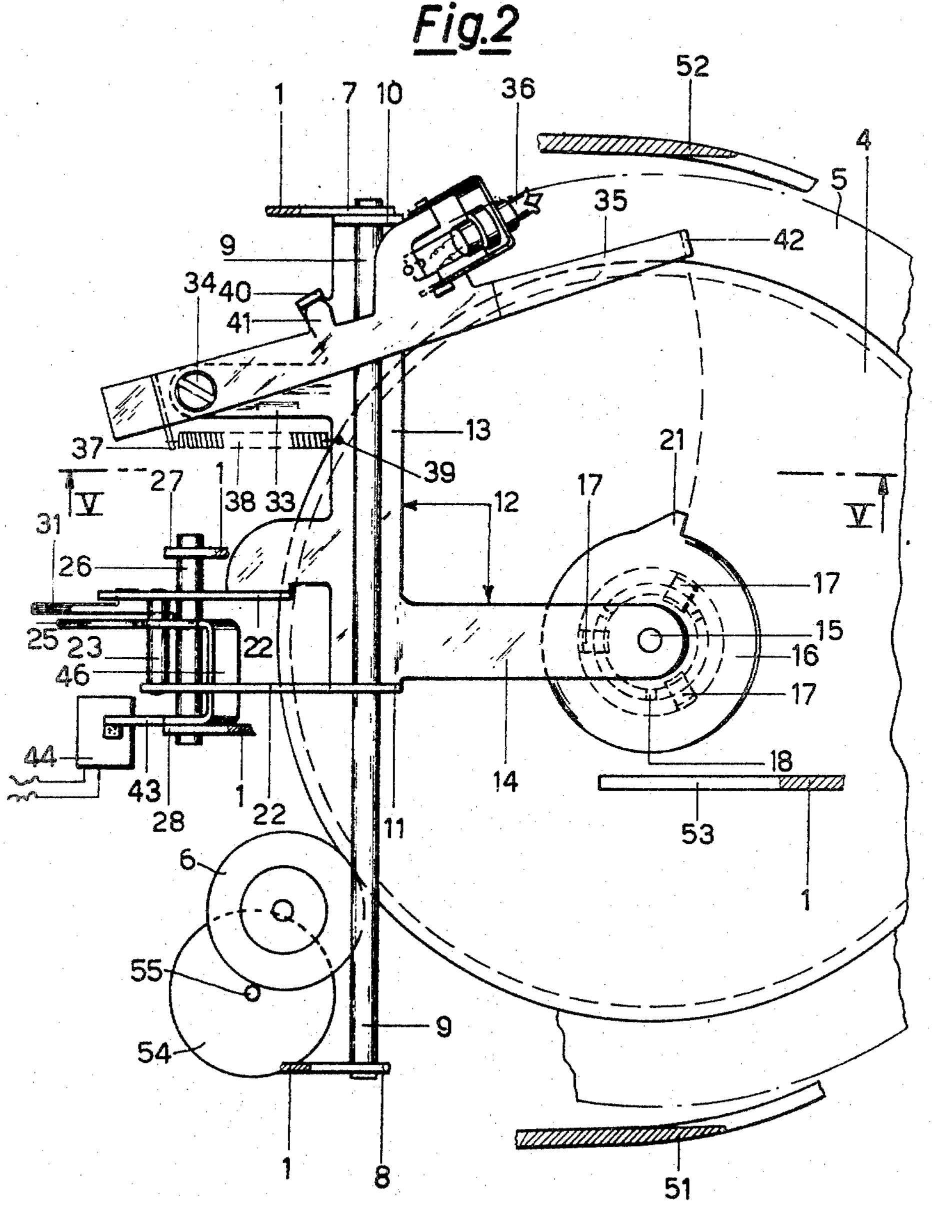
FIGURE 2 is a plan view of the mechanism in the record playing position.

Finally, lever 12 has a further arm 33 which is extended from the portion 13 in the same direction as the tabs 22 but somewhat spaced apart from these (see FIG. 2).

Said arm 33 carries, at its free end, a pin 34 whose axis is perpendicular to the axis of the shaft 9 and, on said pin 34, is mounted, so as to rotate to a limited extent, a pickup arm 35 (see FIGS. 2 and 5) which carries, in a suitable location, and in an oscillable manner, the pickup head 36 with the reading stylus. An abutment 54 prevents the head 36 from being inclined with respect to the arm 35 under the action of a spring 55 beyond a certain angle. The pickup arm 35 has, in the vicinity of the pivotal pin 34 an extension 37, carrying a counterweight 47, and to which is hooked an end of a spring 38, whose other end is hooked to a point 39 of the portion 13 of the lever 12. Said spring 38 tends, with a comparatively low force, to cause the pickup arm 35 to be rotated about the pivot 34 in anticlockwise direction (as viewed in FIG. 2). Said rotation is limited by an abutment 40 carried by the arm 33 of lever 12 and against which abuts an extension 41 of the pickup arm 35. This latter, eventually, carries at its free end a tab 42 facing downwards and intended to cooperate with the tooth 21 provided on the periphery of the conical plug 16. The pickup arm 35 with the parts connected thereto cannot be seen in FIGS. 1, 3 and 4, since it has been omitted from these figures for greater clarity.

The lever 25 carries, solidly affixed to it, a bridge 46 having an extension 43, which, on the rotation about the axis of the pivot 26 can act upon the pushbutton 45 of a switch 44 affixed to the framing and adapted to make (button depressed) or to open (pushbutton left free) the power circuit of the electric motor 54 for actuating the driving wheel 6 so as to drive the turntable 4 so as to rotate. The supporting structure has parts 48 and 49 which define the slot 50 for introducing the records and the guideways 51, 52, 53 for guiding the records during their introduction and ejection.

The operation of the mechanism described above is as follows.

With the mechanism in its rest position (as shown in FIG. 1), the turntable 4 is stationary and the arm 14 of the lever 12, as well as the pickup arm 35, are raised above the turntable. Now, by manually introducing, through the feeding slot 50 formed by the structural parts 48 and 49, and in the direction of the arrows (FIG. 1), a record 5 (of which FIG. 1 shows only a portion), so that the front edge of the record strikes the front edge 32 of lever 25, the latter is rotated anticlockwise about the axis of the pivot 26. As a result of this rotation, a relative movement is produced between the shaped slot 24 and the pin 23, the latter being pushed upwards, so that the arm 14 is rotated clockwise about the axis of the shaft 9, thus depressing the plug 16 and the pickup arm 35.

FIGURE 3 shows the mechanism in an intermediate position on completion of this first rotation. As can be seen, the lever 25 is rotated through a relatively wide angle, whereas the arm 14 of the lever 12 has approached the record by a relatively small angle, on account of the outline of the first branch **24*a* of the slot 24, in order to prevent the conical plug 16 from striking the record 5** before the same has been positioned with its central hole under the plug.

The pin 23 has now reached the point of intersection of the two diverging branches **24*a* and 24*b* of the slot 24. The spring 31 has followed the relative rotation of the levers 12 and 25 and is now in its maximum compressive state and in such a position as to afford its maximum thrust between the tab 22 of the multi-armed lever 12 and the lever 25**.

The projection 43 solid with the lever 25 has been brought to such a position as to depress the pushbutton 45 of switch 44 thus completing the circuit of the electric motor, the latter driving the turntable 4 so as to rotate by means of the wheel 6.

The conical plug 16 has been brought to a position in which a tooth 17 thereof is engaged with one of the lobes 19 of the cam 18 of the turntable 4. At this stage, the manual introduction stroke of the record 5 being continued, the pin 23 overtakes the point of intersection of the two branches **24*a* and 24*b* of the slot 24. The second branch 24*b* of the slot diverges so as to permit a further rotation of the tab 22 clockwise under the action of the spring 31 so that, once the intermediate point of equilibrium has been overcome, the arm 14 with its conical plug 16** snaps downwards.

Figure 4:
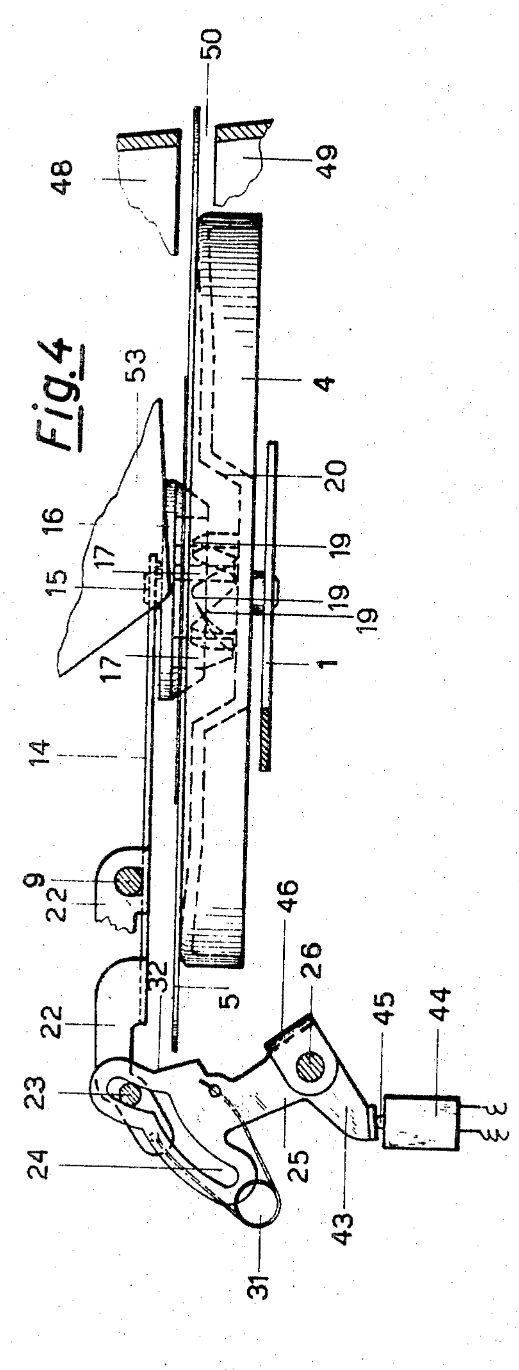
Figure 5:
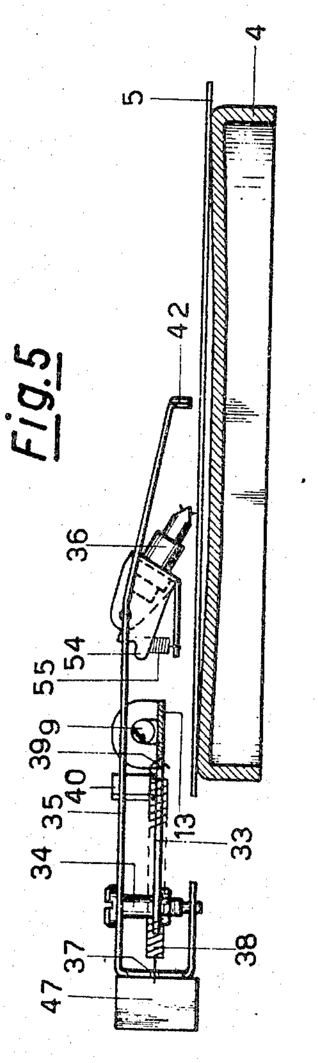
FIGURE 5 is a cross-sectional view through line V—V of FIG. 2.

Thus, the mechanism arrives at the operative position shown in FIG. 4. The outer conical portion of the plug 16 has acted so as to center and hold the record 5 in its appropriate playing position and to press said record against the turntable 4 by virtue of the action of the spring 31. The completion of engagement of the teeth 17 of plug 16 with the lobes 19 of the cam 18 of the turntable 4 causes the formerly idle plug 16 to be driven so as to rotate by the turntable so that, throughout the whole playing stage, the plug will rotate rigidly, both with the turntable and the record.

The pickup arm 35, by being depressed concurrently with the depressional movement of the arm 14, and properly counterbalanced by the counterweight 47, has brought the playing stylus to rest on the clockwise (FIG. 2) rotating record 5, the playing stage being thus initiated. By following the track of the spiral groove of the record 5, the playing stylus, which suitably oscillates on account of the connection of the head 36, which is linked so as to follow the oscillations of the record, is shifted towards the center of the turntable 4, thus dragging the pickup arm 35 and continuing its approaching movement towards the center of the turntable 4, the tab 42 at the end of the pickup; arm 35 eventually arrives in the path of the tooth 21 solid with the plug 16 which rotates solidly with the record 5. Thus, at the end of play of the record, the tab 42 hooks onto the tooth 21 thus preventing any further rotation of the plug 16. The turntable 4, conversely, continues its rotational movement, so that the sloping sides of the lobes 19 of the cam 18 urge the teeth 17 of the plug 16 upwards; this thrust causes an elevational movement of the plug and the arm 14, the latter being consequently rotated anticlockwise about the axis of the shaft 9. The consequence of this rotation is that the pivot 23, borne by the tabs 22, is transferred from the position shown in FIG. 4 to the position shown in FIG. 3. In this latter position, as outlined above, one of the teeth 17 of the plug 16 is still meshing with the corresponding lobe 19 of cam 18, that is, it has not yet reached the apex of said lobe, whereas the rotation of the plug is prevented by the coupling between the tab 42 and the tooth 21, so that the cam, by continuing its rotation, imparts a final axial thrust which is adequate to cause the pin 23 to overcome the point of intersection of the branches 24*a* and 24*b* of the slot 24. As soon as this occurs, the spring 31 imparts a thrust on the lever 25 rocking it clockwise; this rotation is encouraged by the diverging outline of the relevant branch 24*a* of the slot 24. The lever 25 is thus restored to its home position (shown in FIG. 1) with a snap and, with its frontal profile 32 imparts a thrust to the record 5, disengaging from the plug 16, thus expelling the record automatically in a direction which is opposite to the direction of introduction. The return rotation of lever 25, starting from the instant in which the pin 23 overcomes the point of intersection of the branches of the slot 24, causes the extension 43 to be withdrawn from the pushbutton 45 of switch 44 so as to open the electric circuit of the motor which drives the turntable 4, both the motor and the turntable thus stopping.

Concurrently with the lifting of arm 14 the pickup arm 35 is also lifted. Thus, the playing stylus, whose slope with respect to the arm 35 is limited by the abutment 54, is immediately withdrawn from the record 5, while the return of the pickup arm 35 to its home position under the action of spring 38 (of comparatively low strength) is accomplished only after the arm 14 has been lifted sufficiently to disengage the teeth 17 of the plug 16 completely from the cam 18 of the turntable 4. Only now is the tooth 21 of the plug 16 no longer pushed against the tab 42 of the pickup arm 35 and the latter is freed to follow the action of the spring 38 up to the rest position as defined by the abutment 40. By so doing, a slippage of the playing stylus on the record during the return to rest of said stylus is efficiently prevented.

As is apparent from the foregoing disclosure, the playing cycle is completed wholly automatically after the manual introduction of a record. The device can assume any spacial orientation, it can even be overturned, not only during operation (play of a record) but also during the introduction and the ejection of a record. As a matter of fact, during operation, the record is thoroughly locked on the turntable 4 by the conical plug 16, the pickup arm 35 is counterbalanced by the counterweight 47 about the pin 34 and the stylus of the head 36 is kept adherent to the groove of the record by the spring 55.

During the introduction, the record is guided by the introduction slot 50 and the guideways 52 and 53 so as to avoid the record hitting the retaining plug which is in its lifted position, while ensuring that the front edge of the record exactly abuts the profile 32 of lever 25, irrespective of the position of the device in space during the introduction operation. Finally, during ejection, the record is accurately guided by the turntable 4, by the edge 32 of lever 25, by the introduction slot 50 and the guideways 51, 52 and 53, so that, even with the device tilted, or even overturned, ejection can take place in quite regular a manner and without any trouble whatever.

Referring now to FIGS. 6 to 12 inclusive, an embodiment, alternative to the mechanism shown in FIGS. 1 to 5, will be described hereinafter. It should be noticed that the component parts and constructional elements of this alternative embodiment, which correspond, both constructionally and functionally to the previously disclosed component parts and elements, are connoted by the same reference numbers, but increased by one hundred, so they will be no longer described in detail.

A difference between said alternative embodiment and the already described one is that one of the tabs 122 forming an extension of lever 112 has an extension 122*a*. By acting on said extension in the direction of the arrow of FIG. 8 the arm 114 can be brought from the position of FIG. 8 to the position of FIG. 6 so as to interrupt at leisure the play of a record, whenever so desired.

A further difference is that the pickup arm 135 is rotatably borne on a pivot 134, carried by a member 156 independent of lever 122. Member 156 is mounted by means of two ears 157 and 158 on the shaft 109 as an extension of the portion 113 of lever 112. Member 156 carries the abutment 149 which defines the extreme position of the pickup arm 135 (see FIG. 7) and is connected to the portion 113 and to the ear 110 of lever 112 by a spring 159 (see FIG. 9) which tends to rotate said member about the shaft 109 clockwise (as viewed in FIG. 9). This rotation is limited by the abutment of a projection 160 of member 156 against a projection 161, solid with the ear 110.

A further difference is that the pickup arm 135 does not directly cooperate with the tooth 121 of the plug 116 and such a cooperation occurs through an intermediate linkage. More precisely, the pickup arm 135 has a tab 162 perpendicular to its longitudinal axis and which carries at its free end a small pin 163, inserted with a certain clearance, into a slot 164 provided at the end of a lever 165. Lever 165 is rotatably mounted on a pivot 166 carried by the arm 114 of the lever 112 (see FIG. 10). On pivot 166 is rotatably mounted a member 167 whose rotation is limited in one direction by the end of one of the tabs 122 and, in the opposite direction, by the U-bent end of lever 163. As is clearly seen in FIG. 10. member 167 is kept pressed against the curled end of lever 165 with the interpositioning of felt discs, or the like, 168, by the action of a spiral spring 169. The rotation of lever 165 about pivot 166 thus causes the member 167 to rotate by friction about same pivot without any rigid connection between lever 165 and member 167. The latter has a curled end in the form of a beveled tooth 170 intended to cooperate with the tooth 121 of plug 116 in a way which will be more detailedly illustrated hereinafter.

An additional difference is that the return of the pickup arm 135 to its rest position is by positively driven, rather than by drive through a spring, as occurred in the embodiment first described. To this end, arm 135 has a second tab 171 parallel to tab 162, said tab 171 having a curled end 172. Moreover, the bridge 146, which in this embodiment is solid with the other portion of lever 125, as compared with the embodiment of FIGS. 1 to 5, carries, as an entity, an arm 173 parallel to lever 125 and rotatable therewith about the axis of pivot 126. The end of said arm 173 is made to act upon the curled end 172 of tab 171 of the pickup arm 135 as lever 125 is passed from the position of FIG. 8 to that of FIG. 6, thus rotating the pickup arm 135 clockwise about the pivot 134 (as viewed in FIG. 7) so as to bring said arm to the rest position.

The operation of this mechanism is very similar to that of the mechanism shown in FIGS. 1 to 5, inclusive.

In their rest positions, the component parts are in the configuration shown in FIG. 6. By introducing a record 105 to be played through the slot 150, at a certain stage the edge of the record strikes the front edge 132 of lever 125 and the sequence of operations, as already described, takes place for starting the device. The mechanism is now arranged as shown in FIGS. 7 and 8.

The playing stylus of the pickup arm 135 rests on the record 105 at the start 174 of the spiral groove (see FIG. 7). As the stylus progresses in the record groove, the pickup arm 135 is slowly displaced about the pivot 134 and, by means of the linkage pivot 163 and slot 164, lever 165 is also moved angularly shifted about pivot 166 (anticlockwise as viewed in FIGS. 7, 11 and 12). This slow angular displacement corresponds to the small pitch of the spiral groove of record 105 and is transferred by friction (felts 168) to member 167 which is thus slowly rotated about pivot 166 in the sense of causing its beveled tooth 170 to approach the central plug 117. At a certain instant of time, the tooth 170 has approached the plug 116 to such an extent as to interfere with the tooth 121 thereof (see position in FIG. 11). This interference however, is such that the tooth 121 of plug 116 shifts the tooth 170 and member 167 backwardly, which is then moved forwardly, at every revolution of the record, through a small increment and then shifted backwardly again by the tooth 121. When, conversely, on completion of playing the record 105, the stylus reaches the ultimate portion 175 of the groove (which has a much larger pitch, see FIG. 12), member 167 is angularly shifted to such an extent that its tooth 170 is brought to a position in which it hooks up the tooth 121 of plug 116 thus hindering any further rotational movement thereof. The turntable 104 continues, conversely, to be rotated so that the lobes 119 of cam 118 thrust upwards the teeth 117 of plug 116, causing the elevation of both said plug and the arm 114. The projection 161, by pushing against projection 160 of member 156, also causes the lifting of the pickup arm 135 and finally the end of the arm 173, by acting upon the curled end 172 of the tap 171 of the pickup arm 135 brings the latter to its rest position.

Also in this case, the necessary sequence of operations for restoring the mechanism to its rest position is assured, all the manipulations being automatically performed, whatever the spacial orientation of the device. Whenever it is desired to discontinue the playing of a record prior to the end, it suffices to press an extension **122*a*** manually (in the direction of the arrow of FIG. 8), the same sequential steps being initiated as in the case of automatic operation.

It should be observed that, with the arrangement of the several component parts of the inventive mechanism, it has been possible to evolve a particularly compact and small unit. The subdivision of the approach and, withdrawal operation for the centering plug to and from the turntable into at least two rotational intervals of different speeds has enabled the overall height of the device to be considerably reduced. As a matter of fact the overall angle of rotation of the arm which carries the centering plug has been maintained within very restricted limits as is clearly seen by comparing FIGS. 1 and 4 with FIGS. 6 and 8.

It should be observed, in closing, that the headroom beneath the turntable is empty and is intended to house the loudspeaker (not shown) of the record player.

What is claimed is:

1. A gramophone record playing device comprising a casing with a slot for introducing a record to be played, a turntable in said casing for receiving such a record, a motor for driving said turntable, a lever arm oscillatably supported about a first axis parallel to the plane of said turntable, said lever arm having a free end, a freely rotatable member supported on said free end, complementary ratchet clutch teeth on said rotatable member and on the turntable, a control member, the record displacing said control member, a pin and slot connection between said control member and said lever arm, said slot including two consecutive portions forming an angle with respect to each other, a spring element reacting on said lever arm, the strain of said spring being maximum, when said pin is between said two portions, said spring element comprising means for moving said lever arm towards said turntable when said pin engages one of said slot portions and comprising means for moving said lever arm away from said turntable when said pin engages the other one of said slot portions, a pick-up arm connected to said lever arm and provided with detent means for engaging and stopping the rotation of said rotatable member at the completion of the playing of a record.

2. A device according to claim 1, wherein said first axis is located above the turntable plane, said lever arm is provided with at least two tabs which extend beyond the periphery of the turntable, said tabs carrying, in parallel with said first axis, the pin of said pin and slot connection, said slot being formed in said control member, said control member being oscillatably supported about a second axis parallel to said first axis, the second axis being arranged in a plane beneath said turntable, said two consecutive portions of said slot being shaped so that for one of said portions the variation of the radius with respect to the second mentioned axis along the portion itself is less than that of the said other portion.

3. A device according to claim 2, wherein one tab of the lever arm includes an extension, the depression of said extension, during record play, comprising means for oscillating said lever arm away from said turntable.

4. A device according to claim 2, wherein the spring is a compression spring, the ends of which are fixed to one tab of said lever arm and to said control member, the central portion of the spring being coiled.

5. A device according to claim 1, wherein said detent means comprises a tooth provided at the free end of the pick-up arm and the rotatable member is provided with a tooth protruding from its periphery, adapted to be engaged by the tooth of the pick-up arm upon completion of the playing of the record.

6. A device according to claim 1, wherein said detent means comprise a lever oscillatably mounted about a third axis perpendicular to the turntable plane, a tooth protruding from one end of said lever, a linkage connection between the pick-up arm and the lever arm, the linkage connection between said linkage and said lever arm comprising a second pin aligned with said third axis, said lever being oscillatable about said second pin and arranged between said lever arm and said linkage, friction means between the linkage and the lever, the rotation of said linkage about said second pin comprising means for rotating the lever about said second pin, and a tooth protruding from the periphery of said rotatable member.

7. A device according to claim 1, wherein an arm protrudes from said control member in the opposite direction and a projection is provided on the pick-up arm, whereby upon completion of a record play said projection is engaged by said arm.

(References on following page)

References Cited

UNITED STATES PATENTS

| | | | |
|---|---|---|---|
| 3,281,854 | 10/1966 | Fiehn | 274—9 |
| 2,943,861 | 7/1960 | Redfield | 274—9 |
| 2,670,210 | 2/1954 | Thompson | 274—9 |

FOREIGN PATENTS

| | | |
|---|---|---|
| 869,376 | 8/1959 | Great Britain. |

LEONARD FORMAN, Primary Examiner

R. A. FIELDS, Assistant Examiner

F7134BARZANO&ZANARDO(BELLINI ET AL)N2WG2hn70

PO-1050
(5/69)

UNITED STATES PATENT OFFICE
CERTIFICATE OF CORRECTION

Patent No. 3,488,059 Dated January 6, 1970

Inventor(s) Dario Bellini and Mario Bellini

It is certified that error appears in the above-identified patent and that said Letters Patent are hereby corrected as shown below:

In the heading to the printed specification column 1 line 7 for "Patent 180,423" read -- Patent 780,423 --

SIGNED AND
SEALED
JUN 23 1970

(SEAL)
Attest:

Edward M. Fletcher, Jr.
Attesting Officer

WILLIAM E. SCHUYLER, JR.
Commissioner of Patents